United States Patent [19]

Pope et al.

[11] 4,376,070
[45] Mar. 8, 1983

[54] CONTAINMENT OF NUCLEAR WASTE

[75] Inventors: James M. Pope, Monroeville; Don E. Harrison, Murrysville, both of Pa.

[73] Assignee: Westinghouse Electric Corp., Pittsburgh, Pa.

[21] Appl. No.: 162,966

[22] Filed: Jun. 25, 1980

[51] Int. Cl.$^3$ .............................. G21F 9/16
[52] U.S. Cl. ..................... 252/629; 501/12
[58] Field of Search .......................... 252/629; 501/12

[56] References Cited

U.S. PATENT DOCUMENTS 3,597,252  8/1971  Schroder et al. ............... 501/12
3,759,683  9/1973  Dislich et al. .................. 501/12

OTHER PUBLICATIONS

Brezneva et al, "Vitrification of High Sodium-Aluminum Wastes", In: McCarthy, Ed, *Scientific Basis for Nuclear Waste Mgmt.*, Plenum Press, New York, 1979, pp. 43–50.

Lutze et al., "Characterization of Glass and Glass-Ceramic Waste Forms,"*In:*McCarthy, Ed., *Scientific Basis for Nuclear Waste Mgmt.*, Plenum Press, New York, 1979, pp. 69–81.

*Primary Examiner*—Deborah L. Kyle
*Attorney, Agent, or Firm*—R. D. Fuerle

[57] ABSTRACT

Disclosed is a method of immobilizing nuclear waste in glass. A composition is prepared of about 30 to about 85% of a hydrolyzed glass-forming silicon compound, about 5 to about 30% of a glass-forming sodium compound, up to about 30% of a glass-forming aluminum compound, and about 5 to about 30% of a glass-forming boron, calcium, or magnesium compound. Up to an equal amount of nuclear waste is mixed into the composition and the mixture is heated at up to 500° C. until dry. The mixture is then melted at 800° to 1300° C., and can be poured into ingots and cooled. The mixture can also be melted in situ with a laser.

9 Claims, No Drawings

CONTAINMENT OF NUCLEAR WASTE

BACKGROUND OF THE INVENTION

Immobilization of high level nuclear waste in glass is the most extensively studied solid waste form. The usual practice is to dissolve waste oxides and molten glass at high temperatures, that is, greater than 1000° C. In order to achieve homogenization of the mixture in a reasonable time, glass forming systems are selected that have melt viscosities on the order of 20 poises at melt temperatures between 1000° C. and 1200° C. These constraints are best met by borosilicate glass compositions. Although possessing good properties from the viewpoint of waste oxide solubility and glass forming properties, borosilicate waste glasses are lacking in chemical durability. Conversely, glass compositions having excellent chemical durability, such as natural obsidians and nepheline syenite, require such high forming temperatures when made by conventional processing methods that they have been largely eliminated from consideration as a solid waste form.

Even the most intimate mechanical mixing of oxide waste and glass frit (or glass forming constituents) cannot circumvent the non-equilibrium events that can occur during the homogenization process at high temperatures. For example, sublimation of the uncombined oxide is more likely to produce volatilization than is vaporization from a homogenized melt. Specific reactions between the oxide waste and the glass frit to give metastable high volatility melts is more likely to lead to foaming during homogenization than in the final melt composition. Phase separation by density difference creates a degree of heterogeneity that cannot be easily reversed by mixing the viscous melt. Finally, prolonged mixing of submicron powder and glass frit causes additional phase separation due to dusting before the mixture has an opportunity to melt.

SUMMARY OF THE INVENTION

We have discovered a process for containing nuclear waste in which the waste is mixed at room temperature to achieve a degree of homogeneity and reactivity that permits the nuclear waste-glass composition to melt in an equilibrium mode. That is, our intimate mixture melts at essentially a true liquidus temperature instead of requiring higher temperature for homogenization as in conventional processes, and also avoids the non-equilibrium events of conventional processes. In our process the glass formers are partially hydrolyzed, then are mixed together and with the nuclear waste. The mixture is heated to remove the alcohol and water and dry the composition. Finally, the mixture is melted in-can or poured into ingots and cooled. In our process no attempt is made to form a stable gel by chemical polymerization, and therefore the process is much more tolerant of compositional and process control variations.

PRIOR ART

U.S. Patent Application Ser. No. 65,706, filed Aug. 10, 1979, by Bulent Yoldas discloses the preparation of metal oxide glasses by polymerization from alkoxide solutions.

RELATED APPLICATIONS

This application is related to application Ser. No. 162,967, filed concurrently herewith by J. M. Pope et al., titled "Containing Nuclear Waste Via Chemical Polymerization."

DESCRIPTION OF THE INVENTION

The first step in the process of this invention is to prepare a composition into which the nuclear waste can be mixed for subsequent solidification and containment. The composition typically contains four glass forming components. The first glass forming component is prepared from a silicon compound having the general formula $SiR_m(OR')_nX_p$ or $Si(OSiR_3)_4$ where each R is independently selected from alkyl to $C_{10}$ and alkenyl to $C_{10}$, each R' is independently selected from R and aryl, each X is independently selected from chlorine and bromine, m is 0 to 3, n is 0 to 4, p is 0 to 1, and $m+n+p$ equals 4. The $SiR_m(OR')_nX_p$ compounds are preferred due to their availability, stability, and compatibility with the other glass forming constituents. The R' group is preferably alkyl to $C_4$ with $n=4$ because alkoxides are the most suitable starting compounds.

Examples of appropriate compounds which fall within the scope of the general formula include
Trimethylethoxysilane $(CH_3)_3Si(OC_2H_5)$
Ethyltriethoxysilane $C_xH_5Si(OC_2H_5)_3$
Tetrapropoxysilane $Si(OC_3H_7)_4$
Tetraethylorthosilicate $Si(OC_2H_5)_4$
Tetratriethysiloxysilane $Si[OSi(CH_3)_2C_2H_5]_4$
Triethylchlorosilane $(C_2H_5)_3SiCl$
Vinyltriphenoxysilane $CH_2:CHSi(OC_6H_5)_3$ The preferred silicon compound is tetraethylorthosilicate because it is relatively inexpensive, readily available, stable, and easy to handle. Before the silicon compound is added to the composition it is preferable to partially hydrolyze it because its rate of hydrolysis is slower than the other compounds, and preferential precipitation may result if the components are hydrolyzed after they have been combined. This may be accomplished by the addition of alcohol and water to the silicon compound. The molar ratio of a silicon compound to the alcohol can range from about 0.2 to about 2. The alcohol is preferably the same alcohol that is produced during hydrolyzation so that it is not necessary to separate two alcohols. The mole ratio of the silicon compound to the water can range from about to 0.1 to about 5. It is occasionally necessary to use up to about six drops of concentrated nitric acid per mole of water to aid in the hydrolyzation reaction.

The second component of the composition is a sodium compound which facilitates melting. The sodium compound has a general formula $NaOR''$ or $NaZr'_3$ where each R' is independently selected from R and aryl, and R'' is R or hydrogen, and Z is carbon or boron. The $NaOR''$ compounds where R'' is alkyl to $C_4$ are preferred as they are more stable and compatible. The sodium compounds (other than sodium hydroxide) are preferably hydrolyzed prior to being mixed into the composition. A molar ratio of the sodium compound to water of about 0.003 to about 0.1 as previously described may be used for hydrolyzation. Suitable compounds which fall within the scope of the general formula include
Sodium Methylate $NaOCH_3$
Triphenylmethylsodium $NaC(C_6H_5)_3$
Triphenylborylsodium $NaB(C_6H_5)_3$ Sodium methylate is preferred as it is easier to handle and is readily available. The third component of the composition is an aluminum compound and has the general formula $AlR'_q(OR'')_rX_s$ and $Mg(Al(OR)_4)_2$, where each R' is independently selected from R and aryl, each R'' is independently selected from R and hydrogen, q is 0 to 3, r is 0 to 3, s is 0 to 1, and $q+r+s$ is 3. The $AlR'_q(OR'')_rX_s$ compounds, where r is 3 and R'' is alkyl to $C_4$, are preferred as they are the most stable and available and are easiest to handle. Examples of suitable aluminum compounds include Trimethyl Aluminum $Al(CH_3)_3$
Triethyl Aluminum $Al(C_2H_5)_3$
Triethoxyaluminum $Al(OC_2H_5)_3$
Aluminum isopropropate $Al(OC_3H_7)_3$
Aluminum secondary butoxide $Al(OC_4H_9)_3$
Triphenyl Aluminum $Al(C_6H_5)_3$
Aluminum Magnesium Ethoxide $Mg[Al(OC_2H_5)_4]_2$
Diethylaluminum Chloride $(C_2H_5)_2AlCl$ The preferred aluminum compound is aluminum secondary butoxide because it is stable, available, and does not require special handling. These compounds (except for $Al(OH)_3$), can be hydrolyzed prior to addition to the composition but it is not necessary. It is, however, preferable to hydrolyze prior to mixing the glass-forming constituents to avoid inhomogeneities. Hydrolysis can be accomplished using a molar ratio of aluminum compound to water of about 0.0007 to about 0.03 and about 0.03 to about 0.1 moles of 1M $HNO_3$ per mole of AlO(OH) produced. The water should be heated to between 70° and 100° C.

The fourth component of the composition is a compound of boron, calcium, lithium, magnesium, or mixtures thereof. The boron compounds of the general formula $BR'_q(OR'')_rX_s$ where each R' is independently selected from R and aryl, each R'' is independently selected from R and hydrogen, q is 0 to 3, r is 0 to 3, s is 0 to 1, and $q+r+s$ is 3. The compounds where R'' is alkyl to $C_4$ and r is 3 are preferred as they are relatively available and well-matched with the other constituents. Suitable boron compounds which fall within the scope of the general formula include Trimethyl Boron $B(CH_3)_3$
Triethyl Boron $B(C_2H_5)_3$
Trimethyl Borate $B(OCH_3)_3$
Triethyl Borate $B(OC_2H_5)_3$
Triisobutyl Borate $B(OC_4H_9)_3$
Triisoproyl Borate $B(OC_3H_7)_3$
Triisobutylborine $B(C_4H_9)_3$
Dimethyloxyboron Chloride $(CH_3O)_2BCl$
Diphenyl boric acid $(C_6H_5)_2BOH$ Trimethyl borate and triethyl borate are preferred as they are relatively available and are compatible and require very little special handling. The calcium and magnesium compounds have the general formula $MR_t(OR'')_uX_v$, where each R is independently selected from alkyl to $C_{10}$ and alkenyl to $C_{10}$, each R'' is independently selected from R and hydrogen, each X is independently selected from chlorine and bromine, t is 0 to 2, u is 0 to 2, v is 0 to 1, and $n+m+p$ is 2, and M is calcium or magnesium. The compounds where R is alkyl to $C_4$ and n is 2 are preferred as they are compatible and available. Examples of suitable compounds within the scope of the general formula include Dimethyl magnesium $(CH_3)_2Mg$
Diethyl calcium $Ca(C_2H_5)_2$ These compounds may be hydrolyzed in the same manner as the boron compounds prior to their addition to the composition. Calcium or magnesium hydroxide may also be used. The lithium compounds have the general formula LiOR. The compounds where R is alkyl to $C_4$ are preferred as they are more stable and available. Examples of suitable lithium compounds are full within the scope of the general formula include Ethyl Lithium $LiC_2H_5$
N-butyl Lithium $n-C_4H_5Li$ These compounds may be hydrolyzed in the same manner as the boron compounds prior to their addition to the composition. Lithium hydroxide can also be used.

In preparing the composition the silicon compounds should be hydrolyzed as before described and other compounds which can be hydrolyzed may also be hydrolyzed if desired prior to adding to the composition. The composition comprises about 30% to about 85% by weight, calculated as a $SiO_2$, of the silicon compound, up to about 30% by weight, calculated as $Al_2O_3$, of the aluminum compound, about 5% to about 30% by weight, calculated as $Na_2O$, of the sodium compound, and about 5% to about 30% by weight, calculated as a corresponding oxide, of the boron, calcium, lithium, or magnesium compound.

NUCLEAR WASTE

Defense nuclear waste usually is a sludge consisting of a mixture of complex hydroxides or hydrolyzed oxides of aluminum, iron, magnesium, manganese, silicon, calcium, sodium, potassium, ruthenium, mercury, nickel, cesium, strontium, uranium, molybdenum, the transuranics, and other elements. The defense nuclear waste can also include up to about 10% by weight sulfate, phosphate, nitrate, or mixtures thereof and up to about 95% by weight water.

The following table shows the typical major components of calcined defense waste.

|  | High-$Al_2O_3$ | High-$Fe_2O_3$ | Average |
|---|---|---|---|
| $Fe_2O_3$ | 14.80 | 55.90 | 47.16 |
| $Al_2O_3$ | 50.77 | 1.29 | 9.24 |
| $MnO_2$ | 12.16 | 3.74 | 12.98 |
| $U_3O_8$ | 3.57 | 12.98 | 4.25 |
| CaO | 0.97 | 3.80 | 3.51 |
| NiO | 2.17 | 9.54 | 5.84 |
| $SiO_2$ | 1.57 | — | 1.12 |
| $Na_2O$ | 5.41 | 4.75 | 6.63 |
| $Na_2SO_4$ | — | 1.21 | — |
| Zeolite | 8.58 | 8.00 | 8.05 |

The radioactive elements in nuclear waste include uranium, thorium, cesium, ruthenuim, iodine and strontium.

In addition, the process of this invention can be used to immobilize nuclear waste from fuel reprocessing plants, which is usually an aqueous nitrate solution of many of the elements listed above.

Because some of the compounds in the nuclear waste can also act as glass formers, it may be necessary to adjust the glass composition to take account of the particular compounds that are already in the nuclear waste.

IMMOBILIZATION OF WASTE

After the composition has been prepared, the nuclear waste is added to it with stirring and heating up to 500° C. until the water has been evaporated and organics volatilized and the composition is dry. The temperature should be raised slowly in increments of about 5° C. per minute to 300° C., but between 150° C. and 200° C. it may be desirable to heat at a faster rate in order to remove carbon. The temperature is then increased at a rate of 1° C. to 100° C. per minute up to the melting point of the mixture, which is between 800° C. and 1300° C. depending upon the particular composition. The mixture can be melted in situ or poured into ingots, typically having a commercial size of about 3 tons, and cooled. If alumina is present, it may be necessary to cool the mixture at a slightly faster rate to prevent crystallization. Because the mixing and melting steps are separated, innovative glass forming methods are made feasible. The absence of foaming and dusting during melting and the lack of residence time require for homogenization makes it possible to use a high-throughput, joule-heated melter. Alternatively, a hot-wall, in-can melting could be employed without the problems of phase separation. Another possibility is cold-wall, in-can melting which is performed by means of a remote heat source such as a high-power laser. This latter alternative would place the heat source outside the remote processing facility and would permit the use of low-cost container materials such as carbon steel or malleable cast iron.

The following example further illustrates this invention.

EXAMPLE

A hydrolyzed silicon alkoxide was prepared by mixing together 191 grams tetraethylorthosilicate, 165 milliliters ethyl alcohol, 16.5 milliliters deionized water, and two drops of concentrated nitric acid. The mixture was tightly covered and let stand at room temperature for 16 hours. A hydrolyzed aluminum alkoxide was prepared by mixing 732 milliliters deionized water at 80° C., 72.3 grams aluminum secondary butoxide, and 18 milliliters of one molar nitric acid. The mixture was covered tightly and let stand at 80° C. for 16 hours. A hydrolyzed boron alkoxide was prepared by mixing 44.8 grams trimethylborate, 300 milliliters ethyl alcohol, and 24 milliliters deionized water. The mixture was covered tightly and let stand at room temperature for 16 hours. A hydrolyzed sodium alkoxide was prepared by mixing 300 milliliters deionized water and 26.2 grams sodium methylate. The mixture was covered tightly and let stand at room temperature for 16 hours.

The aluminum alkoxide was added to the silicon alkoxide, followed by the addition of the boron and then the sodium alkoxides. The waste, as either dry or wet hydroxides (the weight of water to weight of waste equalled 4) or as dry hydrated oxides, was added within about two minutes after the alkoxides have been combined with vigorous stirring. The mixture was heated to 100° C. and stirred until a dry cake resulted. The mixture was melted by heating in air, increasing the temperature at 10° C. per minute to 1050° C. The following table gives the glass compositions and, the waste compositions that were tested.

| Batch | ←GLASS→ | | | | Waste Form[a] | ←WASTE→ | | | | | | | | Zeo-lite | Total Waste | Melt Temp. for Good Fluidity (°C.) |
|---|---|---|---|---|---|---|---|---|---|---|---|---|---|---|---|---|
| | $SiO_2$ | $Al_2O_3$ | $B_2O_3$ | $Na_2O$ | | $Fe_2O_3$ | $Al_2O_3$ | $MnO_2$ | $U_3O_8$ | CaO | Nio | $SiO_2$ | $Na_2O$ | | | |
| 1 | 43.09 | 11.75 | 11.75 | 11.75 | H | 2.48 | 8.52 | 4.08 | 1.20 | 0.33 | 0.73 | 0.52 | 0.91 | 2.88 | 21.65 | 1050 |
| 2 | 42.44 | 11.57 | 11.57 | 11.57 | H | 9.24 | 0.22 | 1.23 | 4.29 | 1.26 | 3.16 | — | 0.79 | 2.65 | 22.84 | 1050 |
| 3 | 42.70 | 11.64 | 11.64 | 11.64 | H | 7.85 | 1.54 | 4.32 | 1.41 | 1.16 | 1.94 | 0.37 | 1.10 | 2.68 | 22.37 | 1050 |
| 3* | 38.65 | 10.54 | 10.54 | 10.54 | H | 14.20 | 2.78 | 3.91 | 1.28 | 1.05 | 1.76 | 0.37 | 2.00 | 0.70 | 29.74[c] | 1050 |
| 3' | 44.38 | 12.10 | 12.10 | 2.57 | H | 8.16 | 1.60 | 4.49 | 1.47 | 1.21 | 2.02 | 0.34 | 6.73 | 2.78 | 28.85 | 1050 |
| 3° | 37.21 | 10.15 | 10.15 | 10.15 | O | 13.67 | 2.68 | 3.76 | 1.23 | 1.01 | 1.69 | 0.39 | 5.64 | 2.33 | 32.33 | 1150 |
| 4 | 44.77 | 12.21 | 12.21 | 12.21 | H | 0.59 | 15.50 | 0.96 | 0.28 | 0.07 | 0.17 | 0.12 | 0.22 | 0.68 | 18.59 | >1150 |
| 5 | 49.62 | 2.71 | 13.53 | 13.53 | H | 0.65 | 17.18 | 1.06 | 0.32 | 0.08 | 0.19 | 0.14 | 0.24 | 0.75 | 20.61 | 1150 |
| 5* | 42.54 | 1.96 | 9.82 | 9.82 | H | 13.23 | 12.46 | 3.64 | 1.19 | 0.98 | 1.64 | 0.31 | 1.86 | 0.73 | 36.35[d] | >1150 |
| 5' | 46.64 | 12.72 | 12.72 | 2.72 | H | 0.61 | 16.15 | 1.00 | 0.30 | 0.08 | 0.18 | 0.13 | 6.09 | 0.70 | 25.24[c] | >1150 |
| 5" | 51.92 | 2.83 | 14.16 | 3.00 | H | 0.68 | 17.97 | 1.11 | 0.33 | 0.08 | 0.20 | 0.14 | 6.78 | 0.78 | 28.07 | >1150 |
| 5° | 42.11 | 1.94 | 9.72 | 0.65 | H | 13.09 | 12.33 | 3.60 | 1.18 | 0.97 | 1.62 | 0.31 | 10.24 | 0.65 | 45.58[c] | >1050 |
| P | 62.59 | 1.71 | 10.13 | 3.27 | H | 7.86 | 1.54 | 4.32 | 1.42 | 1.17 | 1.94 | 0.37 | 1.10 | 2.68 | 22.40 | 1150 |
| P* | 56.64 | 1.55 | 9.08 | 2.96 | H | 14.22 | 2.79 | 3.91 | 1.28 | 1.06 | 1.76 | 0.34 | 2.00 | 0.70 | 29.78[c] | 1050 |
| P' | 56.54 | 1.55 | 9.08 | 2.96 | O | 14.22 | 2.79 | 3.91 | 1.28 | 1.06 | 1.76 | 0.34 | 2.00 | 0.70 | 29.78[c] | >1050 |
| I-1 | 50.46 | 11.64 | 3.88 | 11.64 | H | 7.85 | 1.54 | 4.32 | 1.41 | 1.16 | 1.94 | 0.37 | 1.10 | 2.68 | 22.37 | 1150 |
| I-2 | 53.88 | 5.73 | 4.13 | 12.41 | H | 8.36 | 1.64 | 4.60 | 1.51 | 1.24 | 2.07 | 0.40 | 1.17 | 2.85 | 23.84 | 1150 |
| I-2* | 47.46 | 5.05 | 3.64 | 10.93 | O | 14.73 | 2.89 | 4.05 | 1.33 | 1.09 | 1.82 | 0.35 | 4.14 | 0.73 | 32.92[c] | ~1050 |
| I-2' | 47.46 | 5.05 | 3.64 | 10.93 | H | 14.73 | 2.89 | 4.05 | 1.33 | 1.09 | 1.82 | 0.35 | 4.14 | 0.73 | 32.92[c] | 1050 |
| I-3 | 50.46 | 3.88 | 11.64 | 11.64 | H | 7.85 | 1.54 | 4.32 | 1.41 | 1.16 | 1.94 | 0.37 | 1.10 | 2.68 | 22.37 | 1050 |
| I-3* | 45.67 | 3.51 | 10.54 | 10.54 | H | 14.20 | 2.78 | 3.91 | 1.28 | 1.05 | 1.76 | 0.34 | 2.00 | 0.70 | 29.74[c] | 1050 |
| I-3' | 45.51 | 3.50 | 10.50 | 10.50 | H | 4.44 | 15.23 | 3.65 | 1.07 | 0.29 | 0.65 | 0.47 | 1.62 | 2.57 | 29.99 | 1050 |
| I-3" | 45.50 | 3.50 | 10.50 | 10.50 | H | 16.77 | 0.39 | 1.12 | 3.89 | 1.14 | 2.86 | — | 1.43 | 2.40 | 30.00 | 1050 |
| I-3° | 45.67 | 3.51 | 10.54 | 10.54 | H | 14.00 | 2.78 | 3.91 | 1.28 | 1.05 | 1.76 | 0.34 | 2.00 | 2.42 | 29.74 | 1050 |
| I-4 | 46.13 | 3.55 | 10.65 | 10.65 | O | 14.34 | 2.81 | 3.95 | 1.29 | 1.06 | 1.77 | 0.34 | 1.01 | 2.45 | 29.02 | 1050 |
| I-4* | 45.67 | 3.51 | 10.54 | 10.54 | O | 14.20 | 2.78 | 3.91 | 1.28 | 1.05 | 1.76 | 0.34 | 2.00 | 0.70 | 29.74[c] | 1050 |
| I-4' | 45.67 | 3.51 | 10.54 | 10.54 | O | 14.20 | 2.78 | 3.91 | 1.28 | 1.05 | 1.76 | 0.34 | 2.00 | 2.42 | 29.74 | 1050 |
| I-4" | 45.51 | 3.50 | 10.50 | 10.50 | O | 4.44 | 15.23 | 3.65 | 1.07 | 0.29 | 0.65 | 0.47 | 1.62 | 2.57 | 29.99 | 1050 |
| I-4° | 45.50 | 3.50 | 10.50 | 10.50 | O | 16.77 | 0.39 | 1.12 | 3.89 | 1.14 | 2.86 | — | 1.43 | 2.40 | 30.00 | 1050 |
| T | 40.81 | b | 7.77 | 14.42 | O | 14.15 | 2.77 | 3.89 | 1.27 | 1.05 | 1.75 | 0.34 | 1.99 | 2.41 | 29.98[f] | 950 |
| U | 40.75 | b | 7.76 | 14.40 | O | 10.82 | 8.46 | 2.98 | 0.97 | 0.80 | 1.34 | 1.52 | 0.28 | 0.25 | 30.10[g] | 950 |
| NS | 55.45 | 12.81 | e | 13.60 | | | | | | | | | | | 0 | >1150 |
| NS | 55.45 | 12.81 | e | 13.60 | | | | | | | | | | | 0 | >1150 |
| NO | 78.59 | 8.43 | — | 12.97 | | | | | | | | | | | 0 | >1150 |

| Batch | GLASS SiO$_2$ | Al$_2$O$_3$ | B$_2$O$_3$ | Na$_2$O | Waste Form$^a$ | WASTE Fe$_2$O$_3$ | Al$_2$O$_3$ | MnO$_2$ | U$_3$O$_8$ | CaO | Nio | SiO$_2$ | Na$_2$O | Zeolite | Total Waste | Melt Temp. for Good Fluidity (°C.) |
|---|---|---|---|---|---|---|---|---|---|---|---|---|---|---|---|---|
| PY | 82.97 | 1.36 | 11.46 | 4.21 | | | | | | | | | | | 0 | ~1150 |

$^a$Hydroxide or Oxide
$^b$Li$_2$O = 3.08 wt %, CaO = 3.91 wt %
$^c$Cs$_2$O = 1.72 wt %
$^d$Cs$_2$O = 0.31 wt %
$^e$18.13 wt % CaO
$^f$Na$_2$SO$_4$ = 0.36 wt %
$^g$Na$_2$SO$_4$ = 2.68 wt %

The above compositions exhibited little or no volatilization above 600° C. and melted uniformly without foaming. They exhibited no phase separation and resulted in a homogeneous glass during furnace cooling or quenching. Reactively mixing the glass formers and waste oxides (or hydroxides) on essentially a molecular scale prior to melting permitted a wide range of waste glass types to be prepared. While conventional waste-glasses contain 40% SiO$_2$ and no Al$_2$O$_3$ in the initial glass composition, we have prepared glasses containing about 60% SiO$_2$+2% Al$_2$O$_3$, about 46% SiO$_2$+4% Al$_2$O$_3$, 40% SiO$_2$+20% Al$_2$O$_3$, and about 40% SiO$_2$+12% Al$_2$O$_3$, for example. The higher silica plus alumina content of these alternate glasses should result in substantially better chemical durability. Indeed, the initial leach rate of $1 \times 10^{-7}$ grams (all species)/cm$^2$/day obtained after 3 weeks in flowing water at 100° C. for the 40% SiO$_2$+12% Al$_2$O$_3$ composition was 10 to 100 times lower than the conventional borosilicate waste glasses. In addition, the higher silica plus alumina content glasses should be more resistant to fracture by thermal shock by virtue of their expected lower thermal expansion coefficient.

I claim:

1. A method of immobilizing nuclear waste comprising:
   (A) preparing a composition which comprises
   (1) about 30% to about 85% by weight, calculated as SiO$_2$, of a silicon compound having the general formula SiR$_m$(OR')$_n$X$_p$ or Si(OSiR$_3$)$_4$ where each R is independently selected from alkyl to C$_{10}$ and alkenyl to C$_{10}$, each R' is independently selected from R and aryl, each X is independently selected from chlorine and bromine, m is 0 to 3, n is 0 to 4, p is 0 to 1, and m+n+p equals 4;
   (2) about 5% to about 30% by weight, calculated as Na$_2$O, of a sodium compound having the general formula NaOR" or NaZR'$_3$, where each R" is independently selected from R and hydrogen, and Z is carbon or boron;
   (3) up to about 30% by weight, calculated as Al$_2$O$_3$, of an aluminum compound having the general formula AlR'$_q$(OR")$_r$X$_s$ or Mg(Al(OR)$_4$)$_2$, q is 0 to 3, r is 0 to 3, s is 0 to 1, and q+r+s equals 3;
   (4) about 5% to about 30% by weight, calculated as the corresponding oxide, of a compound selected from the group consisting of boron compounds having the general formula BR'$_q$(OR")$_r$X$_s$, where q+r+s equals 3, alkaline earth metal compounds having the general formula MR$_t$(OR")$_u$X$_v$ where M is calcium or magnesium, t is 0 to 2, u is 0 to 2, v is 0 to 1, and t+u+v equals 2, lithium compounds having the general formula LiOR, and mixtures thereof, said composition being at least partially hydrolyzed;
   (B) mixing into said composition up to about to an equal amount by weight of said nuclear waste at up to 500° C. until the mixture is dry and organics have been removed; and
   (C) melting said mixture at about 800° C. to 1300° C.

2. A method according to claim 1 including the additional last step of pouring said melted mixture into ingots and cooling.

3. A method according to claim 1 wherein said melting is accomplished in situ with a laser.

4. A method according to claim 1 wherein said nuclear waste is up to about 10% by weight sulfate, phosphate, and nitrate, up to about 85% by weight water, and the remainder is selected from the group consisting of oxides, hydroxides, and mixtures thereof of silicon, aluminum, manganese, iron, calcium, uranium, sodium, potassium, cesium, ruthenium, mercury, and nickel.

5. A method according to claim 1 wherein said silicon compound has the general formula SiR$_m$(OR')$_n$X$_p$ where R' is alkyl to C$_4$ and n=4, said sodium compound has the general formula NaOR" where R" is alkyl to C$_4$, said aluminum compound has the general formula AlR'$_q$(OR")$_r$X$_s$ where R" is alkyl to C$_4$ and r is 3, said boron compound has the general formula BR'$_q$(OR")$_r$X$_s$ where R" is alkyl to C$_4$ and r is 3, and said alkaline earth metal compound has the general formula MR$_t$(OR")$_u$X$_v$ where R" is alkyl to C$_4$ and u is 2.

6. A method according to claim 1 wherein said silicon compound is tetraethylorthosilicate, said sodium compound is sodium methylate, said aluminum compound is aluminum secondary butoxide, and said boron compound is selected from the group consisting of trimethyl borate, triethyl borate, and mixtures thereof.

7. A method according to claim 1 wherein said silicon compound is hydrolyzed in alcohol at a molar ratio of silicon compound to alcohol of about 0.2 to about 2, with water at a molar ratio of silicon compound to water of about 0.1 to about 5.

8. A method according to claim 1 wherein said silicon compound is at least partially hydrolyzed prior to its addition to said composition.

9. Glass immobilized nuclear waste made according to the method of claim 1.

* * * * *